Aug. 18, 1964 R. F. BAUN 3,145,127
METHOD OF INSULATING ELECTRICAL COMPONENTS, SUCH
AS SMALL ELECTRIC MOTORS
Filed June 28, 1961

Inventor:
Raymond F. Baun,
by John M. Stoudt
Attorney.

United States Patent Office 3,145,127
Patented Aug. 18, 1964

3,145,127
METHOD OF INSULATING ELECTRICAL COMPONENTS, SUCH AS SMALL ELECTRIC MOTORS
Raymond F. Baun, Fort Wayne, Ind., assignor to General Electric Company, a corporation of New York
Filed June 28, 1961, Ser. No. 120,423
7 Claims. (Cl. 156—73)

This invention relates to a process for manufacturing electric devices, and more specifically, to an improved process for forming a protective coating on the surfaces of electrical components thereof, such as windings of small dynamoelectric machines such as electric motors.

In certain applications for small dynamoelectric machines such as electric motors, it is desirable, if not necessary, that the electrical components, for example, the windings, be enclosed from the surrounding atmosphere or be suitably insulated from other windings. For instance, fractional horsepower motors are used today in many domestic refrigerators for driving air circulating fans. In order to protect the motor itself and to avoid hazards, it is necessary that the motor windings be effectively separated from the surrounding atmosphere. Considerable condensation of moisture occurs within the refrigerator, and since the condensate may drip or otherwise come into contact with the motors, a water-proof casing should be provided for the windings to prevent short circuiting or grounding by the condensate. Also, since refrigerators are capable of use in excess of 15 years, at least, and the motor windings are susceptible to failure when employed over such an extended period of time, the windings should be encased to prevent the escape of molten copper if failure should occur after years of service. Obviously, if molten copper could escape into the refrigerator, considerable fire and personal hazards would be created. The same considerations hold true for any flames or sparks occurring upon motor failure which should also be prevented from escaping into the surrounding environment. Further, in many instances, space is at a premium, and it is essential that the motors be suitably ventilated to dissipate the heat generated in the windings and motor core to a stream of air passing through the motor.

One proposed solution to these problems is that disclosed and claimed in the copending patent application of Hugo C. Kaeding, Serial No. 58,954, filed September 28, 1960, assigned to the same assignee as the instant invention. Briefly described, among other things, the Kaeding motor includes a stator core which carries the energizing winding of the motor, the winding being formed of a number of turns of metallic wire having an adherent coating of insulating material, such as enamel. To protect the winding and to render it "fail safe," the winding is enclosed within an imperforate protective coating of insulating material which has a predictable melting point and is so arranged that it is not affected by heat within the winding as readily as the insulating coating of the wire itself. During normal operation of the motor, the imperforate protective coating for the winding is effective to prevent the entry of moisture into the winding, thereby aiding in the avoidance of winding failure in the first instance. Further, in the event of a failure of the winding, the outer coating serves to prevent the escape of the molten copper wire and any accompanying sparks or flame to the surrounding area, beyond the confines of the coating itself.

Consequently, for the optimum use of the Kaeding construction, it is necessary that an economically practical manufacturing process be provided, which is capable of producing in mass production quantities an imperforate protective coating for the winding, entirely free of minute discontinuities, with continued regularity; i.e., a minimum of variance in quality between coatings. It is also desirable that the process be as economical as possible to employ in mass production manufacture and avoids the expense of requiring costly equipment and complex coating operations.

Accordingly, it is a general object of the present invention to provide an improved process which is economical and practical to employ in the mass production manufacture of electrical devices.

It is another object of my invention to provide an improved yet inexpensive process for applying an insulating protective coating on the surfaces of electrical components, such as windings.

Yet another object of the invention is the provision of an improved low cost practical process, suitable for mass production use, which will cover windings with an imperforate protective coating capable of protecting the windings from moisture and from the escape of molten copper and flame upon failure, and which will provide imperforate coatings devoid of minute discontinuities with consistent regularity in mass production manufacture.

In carrying out the objects of this invention in one form thereof, I provide an improved manufacturing process in which a magnetic core carrying windings, formed of a number of turns of wire, such as a stator core for use in a small motor, is placed in an unaerated bed of powdered resinous insulating material, with the outer surface of the windings being surrounded by the powdered material. The windings are then energized for a preselected period of time to raise the temperature of the outermost exposed wires above the melting point of the of the material but below their deleterious temperature to form an unhardened coalesced continuous imperforate coating thereon. After the windings have been deenergized and the core removed from the unaerated bed, the core is immediately positioned in a pre-heated oven while the coating is still fusing and heated at a predetermined temperature. At this time, if desired, the protective coating may be substantially cured or hardened into the final covering. I prefer, however, to solidify the coating only to the extent necessary to insure a sufficiently hard coating which permits normal handling of the core during subsequent manufacturing operations without damaging the coating. Concurrently with the partial solidification of the coating, its outer surface is glazed into a smooth finish insuring the void free character of the coalesced coating.

A rotor assembly is then arranged in a predetermined relationship with the stator core, and rotor supporting means are disposed adjacent the stator core with unhardened adhesive bonding material in a plastic state deposited therebetween. The partially hardened winding coating and adhesive material are concurrently hardened to provide respectively an imperforate coating for encasing the windings in a void free substantially uniform cover, and a means for securing the stator core and rotor supporting means together in a permanent relation. This process is highly adaptable to the economical mass production manufacture of magnetic cores, and uses inexpensive equipment to produce imperforate uniform coatings covering the windings which are consistently entirely devoid of minute discontinuities. Thus, for those situations which require a practical yet inexpensive mass production manufacture of cores wherein each coating produced must be void free and capable of protecting the winding from moisture and from the escape of molten copper upon winding failure, my process is of significant importance.

The subject matter which I regard as my invention is particularly pointed out and distinctly claimed in the concluding portion of this specification. My invention, itself, however, both as to its organization and method of operation, together with further objects and advantages thereof may best be understood by reference to the following description taken in connection with the accompanying drawing.

Figure 1:
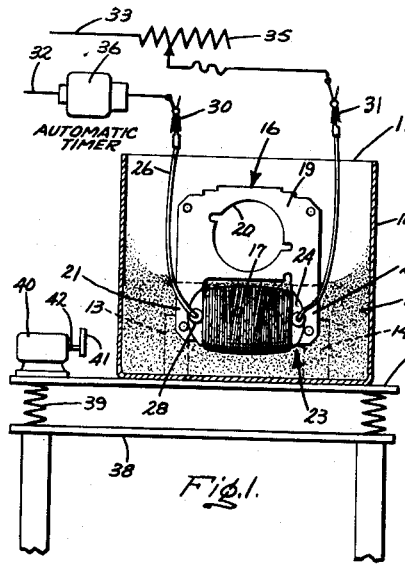
FIG. 1 is a schematic side elevational view, partially in cross section, of the preferred manner in which I apply a protective insulating coating on the exposed surfaces of the winding of a stator core for use in a small electric motor.

Referring now to the drawing in more detail, for the purpose of explaining my invention, the preferred process is illustrated as being employed in the mass production manufacture of small dynamoelectric machines such as electric motors which incorporate the desirable Kaeding construction, previously described. As shown in FIG. 1, the coating apparatus includes a container 10, having an open top indicated at 11, which is suitably supported on a horizontal platform 12. A pair of spaced apart upright supports 13 and 14 are mounted on the bottom wall of the container and an unaerated bed composed of finely powdered thermosetting resinous coating material 15, such as pulverulent epoxy resin No. EPX-24A which is available from National Polymer Products, Inc., fills the bottom portion of container 10 and covers the supports 13 and 14.

In the practice of the process of this invention, a stator core 16, carrying an excitation winding 17, is initially placed on supports 13 and 14 in container 10 with the winding disposed between the supports. Powdered material 15 is then pushed over the winding by hand until the powdered coating material 15 surrounds the winding in the manner shown in FIG. 1.

The stator core 16 of the exemplification includes a laminated yoke section 19 formed with a rotor receiving bore 20 and depending spaced apart leg portions 21 and 22. A winding core section 23 bridges the legs and is in tight engagement with the depending legs 21 and 22. Winding 17, which is random wound on core section 22 and suitably insulated from section 23 by an integral layer 24 of ground insulation, comprises a number of turns of metallic wire having an adherent insulating coating for insulating the various turns from each other. In other words, the wire is formed of the type known in the motor industry as "magnet wire," such as Nyleze wire produced by the Phelps Dodge Copper Products Corporation. The wire extremities (not shown) of winding 17 are electrically connected to lead-in conductors or external leads 26 and 27, with the connection being accommodated in slots, provided at the opposite ends of core section 22, which are filled with suitable insulating filler material 28.

Still referring to FIG. 1, with the stator core 16 arranged in the position shown in container 10, that is, with the powdered material 15 disposed in intimate contact with the outer exposed surface of winding 17, sufficient heat is supplied to the outer surface of winding 17 to melt the powder adjacent winding 17, so as to deposit a coalesed adherent coating over the surface of the winding in a uniform manner. In the preferred embodiment, external leads 26 and 27 are electrically connected, as by quick-connect means 30 and 31, to a suitable source of energy; e.g., direct current supply lines 32 and 33. Winding 17 is suitably energized such that the outer wires will attain a pre-selected temperature for a predetermined period of time above the melting point of the material but below the temperature at which the temperature sensitive components of the core, for example, the wire itself, will become deleteriously affected. By "melting point" as used herein is meant that stage at which the powdered material is sufficiently tacky to adhere to the exposed heated wire surfaces of winding 17. The transfer of heat between the heated wires and powdered material 15 causes the powder to coalesce into an adherent continuous generally uniform protective coating 34 (FIG. 2) which is entirely free of voids or diminutive gas bubbles. Further, with the use of the unearated bed, the particle size is not especially critical to produce the void free protective coating 34. Since stator core 16 as a whole remains below the melting point of coating material 15 throughout this coating procedure, no material will adhere to the core at locations not intended to be coated, thus obviating the need for masking the stator core to prevent the deposit of material at such locations and resulting in a saving of coating material.

It should be noted at this point that for those applications which require a water impervious and flame resistant joint between coating 34 at the ends of the winding and the winding core section 23, ground insulating layer 24 should be chosen to be compatible with the material of coating 34 so that the coating will bond to it as it is being formed over winding 17. A suitable compatible material for layer 24 to effect the desired bonded joint is a mica filled epoxy resin having a suitable hardener, such as an amine hardener.

It will be recognized by those skilled in the art that the precise temperature to which the winding should be heated and the total duration of time the winding should be energized when the stator core 16 is in the unaerated bed are, of course, dependent upon several factors, such as the type of wire used for winding 17, the kind of powdered material utilized for coating 34, and the thickness of the coating requried for the particular application. These can be determined with a minimum amount of experimentation. In any event, a standard rheostat 35 and timer device 36 may be employed to control the transfer of heat with the requisite accuracy between the winding and coating material 15. For example, I have obtained satisfactory results in coating the motor winding of the exemplification with the epoxy resin EPX-24A coating material by energizing winding 17 for approximately 15 seconds with a power input of 700 watts.

If desired, powdered material 15 and the stator core 16 may be vibrated during the aforedescribed coating procedure to cause a tremulous relative movement between winding 17 and the surrounding powdered material. This tends to insure an intimate contact of the powdered material 15 with all parts of the exposed outer surface of winding 17, especially in the crevices between adjacent outer wires of winding 17 and other possible interstices. One way in which this tremulous relative motion may be provided is to mount horizontal platform 12 resiliently on a frame assembly on table 38 by means of suitable springs 39. A conventional small motor 40 may be secured to platform 12 in any convenient manner and provided with an eccentric fly wheel 41 on shaft 42. High speed rotation of eccentric fly wheel 41 effects a vibration of platform 12 and container 10, which in turn, produces vibration and a relative movement between the powdered material 15 and stator core 16. It will be readily apparent that other suitable means may be employed to accomplish this relative motion and the arrangement shown in FIG. 1 is merely for purposes of illustration.

Figure 2:
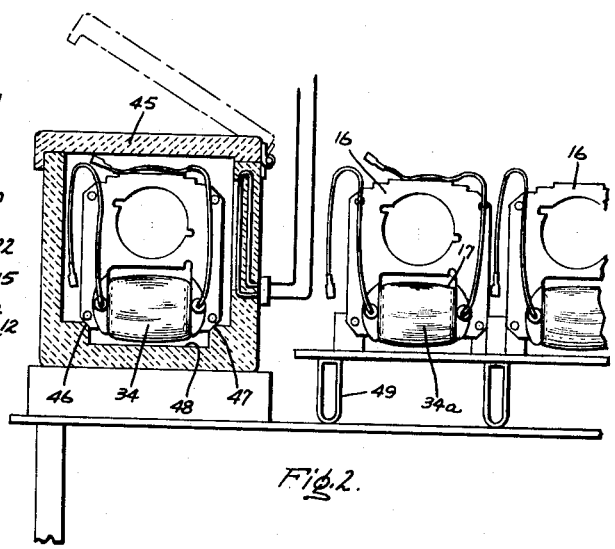
FIG. 2 is a view, partially in cross section of an initial curing step.

When the winding 17 of core 16 acquires a continuous soft coating 34 of the melted particles in the desired thickness and the winding has been deenergized, the core is removed from the unaerated bed of container 10 and is placed in a preheated oven, identified by numeral 45 in FIG. 2. Preferably, the transfer of core 16 from container 10 to oven 45 should be accomplished while the softened coating 34 continues to flow or to fuse and before it has had an opportunity to cool to the degree that it acquires a granulated consistency which may provide minute discontinuities in the final coating and destroy the completely imperforate quality of the covering.

Referring now to FIG. 2 and to the post-heating step, it is desirable that core 16 be supported in the oven such that the unhardened coating will not come into contact with any part of the oven, which could damage the newly formed coating. Shoulders 46 and 47 in oven 45, along with recess 48 provided in the bottom wall of the oven, serve to support coating 34 in spaced relation within the oven. It will be recognized by those skilled in the art that the continuous imperforate coating 34 provided by the unaerated bed could be substantially cured in oven 45 to form a hardened coating encasing the windings 17. In addition, while the invention is illustrated as applying a coating over a single motor winding in the form of an imperforate protective covering, any coil surface may be coated by my invention where a protective coat or insulation is desirable. For instance, my process may be employed in the formation of an insulating coating over the coils of one winding, and another winding may be arranged next to the hardened cover which then acts to insulate one group of coils from the other.

For reasons which will become more evident as the description proceeds, in the post-heat step of FIG. 2, I prefer to produce only an initial or partial cure of the coating, rather than a substantially cured protective cover. I prefer to heat the coating to the degree that only a partial solidification of coating 34 is effected, that is, the coating is sufficiently hardened to the point that it can withstand normal handling without becoming damaged during subsequent manufacturing operations. This application of heat concurrently tends to glaze the outer surface of the coating into a smooth imperforate finish, further insuring the void free character of the coating. The temperature attained in the winding during this post-heating operation must be below the deleterious temperature of the enameled wire of the winding in order to avoid damage to the wire. I have found that a post-heat at 110 degrees centigrade for ten minutes, with epoxy resin EPX-24A as the coating material, gives satisfactory results.

Figure 3:
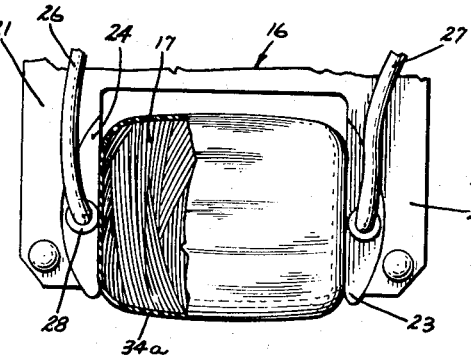
FIG. 3 is an enlarged view, partially in section, of a portion of the stator core of FIG. 2, after it has been placed on a supporting rack following the step shown in FIG. 2, to show details of the coating.
Figure 5:
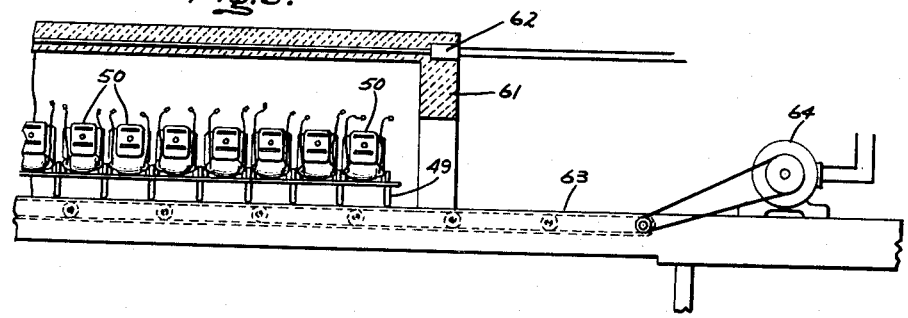
FIG. 5 illustrates the final step in the assembly of the motor of the exemplification.

Upon completion of the post-heating step, core 16 with its partially hardened coating, shown at 34a in FIGS. 2 and 3, is stored on a suitable rack 49 preparatory to the succeeding assembly operations. In view of the partial cure and the characteristics imparted to the coating by the post-heating step just described, the period of time that core 16 is stored on rack 49 before the final cure of the coating has been accomplished is not particularly critical, and the excellent uniform continuity and void free coating qualities, provided by the unaerated bed coating procedure, will not be adversely affected during this storage period.

Figure 4:
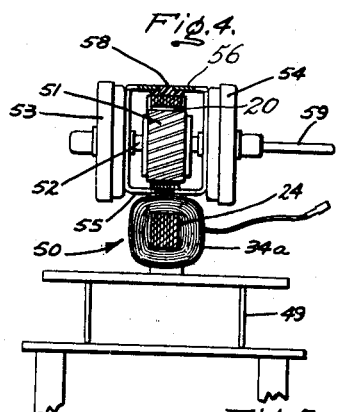
FIG. 4 is a side view of a small electric motor incorporating one of the stator cores shown in FIG. 2.

After a number of cores 16, each including a partially hardened coating 34a, have been placed on rack 49, the cores and rack may be conveniently transported to the next assembly station where stator core 16 will be incorporated into a small motor 50. As seen in FIG. 4, at this station, rotor 51, suitably fastened to output shaft 52, is arranged concentrically within stator bore 20, and bearing assemblies 53 and 54, having suitable bearings (not shown), are slid over the shaft ends until bearing brackets 55 and 56, generally U-shaped in configuration, have their respective legs positioned in slightly overlapped relation to the adjacent outer axial surface of core 16. An adhesive bonding material 58 in its unhardened or plastic state is disposed between the core 16 and the legs of brackets 55 and 56. In the exemplification, material 58 is of the thermosetting epoxy resin type, such as an epoxy resin having a polyamide curing agent. This material may be applied in any suitable manner at the proper location, such as for example, to the outer surfaces of stator core 16 prior to the assembly of bearing brackets 55 and 56 over the bight portion of the core.

Thus, shaft 52 will ultimately be supported by identical bearing assemblies 55 and 56, the only difference between the assemblies being that the right hand one (as viewed in FIG. 4) includes an open end cap instead of the closed one to accommodate the output shaft extension 59. Since bearing assemblies 53 and 54 are disclosed in detail and claimed in the aforeidentified co-pending Kaeding application and form no part of the present invention, they will not be further discussed.

With the component parts of motor 50 in the final assembled relation, as depicted by FIG. 4, the adhesive bonding material 58 and winding coating 34a are simultaneously finally cured or solidified by any convenient means, such as by the application of a controlled heat provided by kiln 61 and its heating element 62. In the illustrated arrangement, a plurality of finally assembled motors 50 are held upright by rack 49, which is carried through the kiln on a belt type conveyer 63, which in turn is driven at a regulated rate by motor and pulley assembly 64 so that a predetermined cure is obtained with the use of kiln 61. For example, using the specific compositions mentioned above for materials 15 and 58, I have produced good results by heating the motors in an ambient of 150 degrees centigrade for approximately two hours. This sets up and hardens adhesive material 58, securing the bearing assemblies 53 and 54 in a permanent predetermined fixed relation with the outer surface of the stator core 16, and substantially completes the hardening of coating 34a into a hardened cover, totally devoid of even minute discontinuities or other voids.

Considering all of the foregoing, it will be appreciated that I have provided a new and improved yet economical process for forming a generally uniform adherent coating on windings of a magnetic core which utilizes inexpensive equipment, and relatively simple manufacturing procedures, such as the unaerated bed. My process is especially advantageous for making the optimum use of the Kaeding construction and insures the constant provision of a "fail safe" and moisture proof covering encasing windings, which is entirely free of minute discontinuities, even when produced in mass production quantities. In addition, when used in the manufacture of electric devices utilizing hardenable material for securing together component parts, my process is of particular benefit and reduces the number of manufacturing steps required in the over-all production of such devices and permits simultaneous hardening of all the material without adversely affecting the quality of the imperforate coating for the winding.

It should be apparent to those skilled in the art, while I have shown and described what at present is considered to be the preferred embodiment of my invention in accordance with the patent statutes, changes may be made in the disclosed process without actually departing from the true spirit and scope of this invention, and I therefore intend to cover in the following claims all such equivalent variations as fall within the invention.

What I claim as new and desire to secure by Letters Patent of the United States is:

1. A method for the formation of a continuous insulating coating on the outer surface of a winding formed of a number of turns of wire arranged on a magnetic core comprising: placing at least the portion of the core carrying the winding in a substantially unaerated bed of powdered coating material with the outer surface of the winding being below the melting point of the material and with the winding being covered by said powdered material, heating the outer surface of the winding to a predetermined temperature above the melting point of the coating material but below the deleterious temperature of the temperature sensitive parts of the core for coalescing the coating material onto the outer surface of the winding, discontinuing the heating of said outer surface and removing the core from said unaerated bed, and hardening the coalesced coating material into a continuous coating adhering to the outer surface of the winding.

2. A method for the formation of a continuous adherent coating on the outer surface of windings formed of a number of turns of wire arranged on a magnetic core comprising: placing at least the portion of the core carrying the windings in a substantially unaerated bed of finely powdered coating material with said outer surface being below the melting temperature of the material and being surrounded by said powdered material, energizing the windings to heat the outermost wires to a temperature above the melting point of the coating material but below the deleterious temperature of the temperature sensitive parts of the core for coalescing the coating material onto the outermost wires while vibrating the core and coating material, deenergizing the windings and removing the core from said unaerated bed, and hardening the coalesced coating material into a continuous coating adhering to the outer surfaces of the windings.

3. A method for the formation of a continuous imperforate protective coating encapsulating windings formed of a number of turns of wire wound on a magnetic core comprising: placing at least the portion of the core carrying the windings in a substantially unaerated bed of powdered resinous coating material with the outer surface of the windings being below the melting temperature of the material and surrounded by said powdered material, energizing the windings to heat the outermost wires to a temperature above the melting point of the coating material but below the deleterious temperature of the wires for coalescing the coating material onto the outermost wires, deenergizing the windings, and removing the core from said unaerated bed, and curing the coalesced coating material into a continuous, imperforate adherent coating encapsulating the windings.

4. A method of manufacturing a dynamoelectric machine including a stator core having windings formed of a number of turns of wire, a rotor and shaft assembly, and rotor supporting means, comprising the steps: placing the stator core in a bed of substantially unaerated powdered insulating material with the outer surface of windings being below the melting temperature of the material and surrounded by the powdered material; heating the outermost wires to a predetermined temperature above the melting point of the material but below the deleterious temperature of the wires to form at least a partially coalesced coating on the outer surface of the windings; discontinuing the heating of the wires and removing the stator core from the unaerated bed; partially hardening the coalesced coating; assembling the rotor and shaft assembly and the stator core in a predetermined relationship with the rotor supporting means positioned adjacent the stator core and with an unhardened adhesive bonding material in contact with said stator core and rotor supporting means; and hardening the coalesced coating and adhesive bonding material to provide a hardened continuous coating encasing the windings and to secure together the rotor supporting means with the stator core.

5. A method of manufacturing a dynamoelectric machine including a stator core having windings formed of a number of turns of wire, a rotor and shaft assembly, and rotor supporting means, comprising the steps: placing the stator core in a bed of substantially unaerated powdered resinous insulating material with the outer surface of windings being surrounded by the powdered material; energizing the winding to heat the outermost wires to a predetermined temperature above the melting point of the material but below the deleterious temperature of the wires to form at least a partially coalesced coating thereon; deenergizing the winding and removing the stator core from the bed of powdered material; heating the coalesced coating above its melting temperature but below the deleterious temperature of the wires until the coating is partially but not entirely hardened to produce a glazed appearance, assembling the rotor and shaft assembly and the stator core in a predetermined relationship with the rotor supporting means positioned adjacent the stator core and with an unhardened adhesive bonding thermosetting material disposed between said core and said means; and concurrently hardening the coalesced coating and said adhesive thermosetting material to provide a hardened imperforate continuous coating encasing the windings and to secure together the rotor supporting means with the stator core in a permanent relation.

6. A method of manufacturing a dynamoelectric machine including a stator core having windings formed of a number of turns of wire, a rotor and shaft assembly, and rotor supporting means, comprising the steps: placing the stator core in a bed of substantially unaerated powdered epoxy resinous insulating material with the outer surface of the windings being below the melting temperature of the windings and surrounded by the powdered material; engergizing the windings to heat the outermost wires to a predetermined temperature above the melting point of the material but below the deleterious temperature of the windings while vibrating the core and powdered material to form an unhardened coating adhering to the outermost wires of the windings; deenergizing the windings and removing the stator core from the bed of powdered material; heating and unhardened coating of material for a predetermined time until it is partially but not entirely cured; assembling the rotor and shaft assembly and the stator core in a predetermined relation with the rotor supporting means positioned adjacent the stator core and with an unhardened adhesive thermosetting epoxy resin material disposed between said core and said means; and concurrently curing the partially cured coating and said adhesive thermosetting material to provide a hardened imperforate continuous coating encasing the windings in a moisture proof covering and to secure together the rotor supporting means with the stator core in a permanent relation.

7. A method for forming a continuous generally imperforate adherent coating on the outer surface of a winding defined by a number of turns of wire arranged on magnetic core having a ground insulation layer of resinous material disposed betwen the winding and core comprising: arranging the portion of the core carrying the winding and insulation layer in a substantially unaerated bed of powdered resinous material compatible with said resinous insulation layer, with the exposed surface of the winding being covered by said powdered material; heating the outer surface of the winding to a predetermined temperature above the melting point of the material but below the deleterious temperature of the winding for coalescing said powdered material onto the winding outer surface and onto a part of said insulation layer; causing said winding and the powdered material adjacent the winding to tremulate relative to one another as the exposed surface is being heated thereby filling the interstices of said outer winding surface as the material coalesces; and hardening the coalesced material into a continuous, generally imperforate, coating adhering both to said outer winding surface and to said insulation layer for encasing said winding therein.

References Cited in the file of this patent
UNITED STATES PATENTS

| 1,675,419 | Myers | July 3, 1928 |
| 2,423,345 | Roters | July 1, 1947 |
| 2,442,183 | Stearns | May 25, 1948 |
| 2,594,096 | Trigg | Apr. 22, 1952 |
| 2,611,930 | Hill et al. | Sept. 30, 1952 |
| 3,039,987 | Elbling | June 19, 1962 |
| 3,093,510 | Olson et al. | June 11, 1963 |